United States Patent
Cho et al.

(10) Patent No.: US 9,723,239 B2
(45) Date of Patent: Aug. 1, 2017

(54) IMAGE SENSOR AND METHOD OF OUTPUTTING DATA FROM THE IMAGE SENSOR

(71) Applicant: SAMSUNG ELECTRONICS CO., LTD., Suwon-si (KR)

(72) Inventors: Kyuik Cho, Hwaseong-si (KR); Se-Jun Kim, Seoul (KR); Youngtae Jang, Pyeongtaek-si (KR); Jinho Seo, Seoul (KR); Sung-Ho Suh, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 80 days.

(21) Appl. No.: 14/797,621

(22) Filed: Jul. 13, 2015

(65) Prior Publication Data
US 2016/0142653 A1 May 19, 2016

(30) Foreign Application Priority Data
Nov. 17, 2014 (KR) .................. 10-2014-0160033

(51) Int. Cl.
H04N 5/378 (2011.01)
H04N 5/353 (2011.01)
H04N 5/3745 (2011.01)

(52) U.S. Cl.
CPC .......... *H04N 5/378* (2013.01); *H04N 5/353* (2013.01); *H04N 5/3532* (2013.01); *H04N 5/3745* (2013.01)

(58) Field of Classification Search
CPC ...... H04N 5/378; H04N 5/3532; H04N 5/345; H04N 5/374; H04N 5/347; H04N 5/341; H04N 5/3452; H04N 5/3456
See application file for complete search history.

(56) References Cited

U.S. PATENT DOCUMENTS

| 7,361,877 | B2 | 4/2008 | McGrath et al. |
| 7,675,559 | B2 * | 3/2010 | Kishi .................. H04N 5/3532 348/281 |
| 7,852,386 | B2 * | 12/2010 | Aoki ..................... H01L 27/146 348/241 |
| 8,174,598 | B2 | 5/2012 | Ebihara |

(Continued)

FOREIGN PATENT DOCUMENTS

JP 2011-135185 A 7/2011

OTHER PUBLICATIONS

Masaki Sakakibara et al.; "An 83dB-Dynamic-Range Single-Exposure Global-Shutter CMOS Image Sensor with In-Pixel Dual Storage"; IEEE International Solid-State Circuits Conference; Image Sensors; Feb. 22, 2012; pp. 380-382.

*Primary Examiner* — Shahbaz Nazrul
(74) *Attorney, Agent, or Firm* — Sughrue Mion, PLLC

(57) ABSTRACT

An image sensor capable of implementing a global shutter mode and a rolling shutter mode is provided. The image sensor includes a row driver, a pixel array, an analog-to-digital converter, and an output compensating circuit. The row driver performs decoding for a reset operation, a transfer operation and a read operation, and generates control signals. The pixel array, in a rolling shutter mode, performs the transfer operation on a second row group while the read operation for a first row group is performed, and receives an optical signal, converts the optical signal to electrical signal, and outputs the electrical signal as an image signal in response to the control signals.

20 Claims, 17 Drawing Sheets

(56) References Cited

U.S. PATENT DOCUMENTS

| | | | |
|---|---|---|---|
| 2008/0055439 A1* | 3/2008 | Mabuchi | H04N 5/3532 348/296 |
| 2008/0284884 A1* | 11/2008 | Makino | H04N 5/3454 348/296 |
| 2009/0033779 A1* | 2/2009 | Mo | H04N 5/361 348/308 |
| 2009/0180010 A1* | 7/2009 | Adkisson | H01L 31/103 348/294 |
| 2011/0001859 A1* | 1/2011 | Matsuura | H04N 5/2354 348/296 |
| 2011/0102622 A1* | 5/2011 | Ebihara | H04N 5/3456 348/222.1 |
| 2011/0102623 A1* | 5/2011 | Ebihara | H04N 5/343 348/222.1 |
| 2013/0070121 A1* | 3/2013 | Gu | H04N 5/2329 348/239 |
| 2013/0182161 A1* | 7/2013 | Nakajima | H04N 5/335 348/300 |
| 2016/0182790 A1* | 6/2016 | Horesh | H04N 5/2256 348/371 |

\* cited by examiner

IMAGE SENSOR AND METHOD OF
OUTPUTTING DATA FROM THE IMAGE
SENSOR

CROSS-REFERENCE TO RELATED
APPLICATION

This application claims priority from Korean Patent Application No. 10-2014-0160033 filed on Nov. 17, 2014, the disclosure of which is hereby incorporated by reference in its entirety.

BACKGROUND

Field

Devices, apparatuses and articles of manufacture consistent with exemplary embodiments relate to an image sensor and an image processing device including the image sensor.

Description of Related Art

An image sensor, particularly a complementary metal-oxide semiconductor (CMOS) image sensor, is mounted in a camera of a mobile phone, a digital still camera, etc., and captures images in the field of view of the camera, converts the images into electrical signals, and converts the electrical signals into transmittable digital image signals. The digital image signals output from the CMOS image sensor are color image data having three colors (red, green, and blue), and signal processing is performed on the digital image signals to drive a display device such as a liquid crystal display (LCD).

SUMMARY

One or more exemplary embodiments provide an image sensor capable of implementing a global shutter mode and a rolling shutter mode without quality degradation.

One or more exemplary embodiments also provide a method of outputting data from an image sensor capable of implementing a global shutter mode and a rolling shutter mode without quality degradation.

In accordance with an aspect of an exemplary embodiment, there is provided an image sensor including a row driver, a pixel array, an analog-to-digital converter, and an output compensating circuit. The row driver is configured to perform decoding for a reset operation, a transfer operation and a read operation, and to generate a transfer control signal, a reset control signal and a row selecting signal. The pixel array is configured to perform the transfer operation on a second row group while the read operation for a first row group is performed in a rolling shutter mode, and configured to receive an optical signal, convert the optical signal to an electrical signal, and output the electrical signal as an image signal, in response to the transfer control signal, the reset control signal and the row selecting signal from the row driver. The analog-to-digital converter is configured to perform an analog-to-digital conversion on the image signal from the pixel array to generate first signals; and the output compensating circuit is configured to perform compensation on the first signals to generate second signals.

In a global shutter mode, the reset operation may be simultaneously performed on the first row group and the second row group and the transfer operation may be simultaneously performed on the first row group and the second row group, and the read operation may be performed on the second row group after the read operation for the first row group is completed.

Each of the first row group and the second row group may include one or more rows.

Each of the first row group and the second row group may include two rows, four rows or eight rows.

In the rolling shutter mode, the reset operation of a second frame may be performed before the read operation of a first frame is completed.

In the rolling shutter mode, a transfer operation may be performed on the first row group of a second frame while the read operation is performed on a last row group of a first frame.

In the rolling shutter mode, an operation of charge integration may be performed on the second row group of a second frame while the read operation is performed on the last row group of the first frame.

In the rolling shutter mode, the reset operation may be performed on the second row group of the second frame while the transfer operation is performed on the last row group of the first frame.

In the rolling shutter mode, the read operation may be performed on the second row group after the read operation for the first row group is completed, and the read operation may be performed on a third row group after the read operation for the second row group is completed.

The row driver may include a reset control circuit configured to control the reset operation; a transfer control circuit configured to control the transfer operation; a read control circuit configured to control the read operation; and a logical OR circuit configured to perform a logical OR operation on output signals of the reset control circuit, output signals of the transfer control circuit, and output signals of the read control circuit.

The reset control circuit may include a reset decoder configured to decode m signals to generate n pulse signals ($n=2^m$); and a logical AND circuit configured to perform a logical AND operation on output signals of the reset decoder and each of a first storage control signal, a first transfer control signal and a first overflow control signal to generate a first decoded storage control signal, a first decoded transfer control signal and a first decoded overflow control signal.

The transfer control circuit may include a transfer decoder configured to decode m signals to generate n pulse signals ($n=2^m$); and a logical AND circuit configured to perform a logical AND operation on output signals of the transfer decoder and each of a second storage control signal, a second transfer control signal, a first reset control signal and a second overflow control signal to generate a second decoded storage control signal, a second decoded transfer control signal, a first decoded reset control signal and a second decoded overflow control signal.

The read control circuit may include a read decoder configured to decode m signals to generate n pulse signals ($n=2^m$); and a logical AND circuit configured to perform a logical AND operation on output signals of the read decoder and each of a second reset control signal, a third transfer control signal and a first row selecting signal to generate a second decoded reset control signal, a third decoded transfer control signal and a first decoded row selecting signal.

The transfer control circuit may include a transfer decoder configured to decode m signals to generate n pulse signals ($n=2^m$); and a logical AND circuit configured to perform a logical AND operation on output signals of the transfer decoder and each of a second storage control signal, a second transfer control signal, a first reset control signal and a second overflow control signal to generate a second decoded storage control signal, a second decoded transfer control signal, a first decoded reset control signal and a second decoded overflow control signal, and the read control circuit may comprise a read decoder configured to decode m signals to generate n pulse signals (n=2$^m$); and a logical AND circuit configured to perform a logical AND operation on output signals of the read decoder and each of a second reset control signal, a third transfer control signal and a first row selecting signal to generate a second decoded reset control signal, a third decoded transfer control signal and a first decoded row selecting signal.

According to an aspect of another exemplary embodiment, there is provided an image sensor including a row driver, a pixel array, and analog-to-digital converter, and an output compensating circuit. The row driver is configured to perform decoding for a reset operation, a transfer operation and a read operation, and to generate a transfer control signal, a reset control signal and a row selecting signal. The pixel array is configured to perform the transfer operation on a current row while the read operation for a previous row is performed in a rolling shutter mode, and configured to receive an optical signal, convert the optical signal to an electrical signal, and output the electrical signal as an image signal in response to the transfer control signal, the reset control signal and the row selecting signal from the row driver. The analog-to-digital converter is configured to perform an analog-to-digital conversion on the image signal from the pixel array to generate first signals, and the output compensating circuit is configured to perform compensation on the first signals to generate second signals.

The reset operation may be simultaneously performed on the previous row and the current row, and the transfer operation may be simultaneously performed on the previous row and the current row, and the read operation may be performed on the current row after the read operation for the previous row is completed.

According to an aspect of another exemplary embodiment, there is provided an image sensor including a pixel array and a row driver. The pixel array includes a pixel driving circuit for each of a plurality of pixels, the pixel driving circuit configured to receive an optical signal, convert the optical signal to an electrical signal, and output the electrical signal as an image signal, in response to a transfer control signal, a reset control signal, and a row selecting signal. The row driver is configured to generate the transfer control signal, the reset control signal and the row selecting signal to control the pixel driving circuits to perform a transfer operation on a second row group while performing a read operation for a first row group.

The row driver may control the pixel driving circuits to start the transfer operation on the second row group at the same time as starting the read operation for the first row group.

The row driver may control the pixel driving circuits to start the transfer operation on the second row group after starting the read operation for the first row group such that a portion of the transfer operation overlaps the read operation.

Each pixel driving circuit may include a photodiode and a storage diode.

BRIEF DESCRIPTION OF THE DRAWINGS

The foregoing and other aspects will be apparent from the following description of exemplary embodiments with reference to the accompanying drawings in which.

DETAILED DESCRIPTION OF EXEMPLARY EMBODIMENTS

Figure 1:
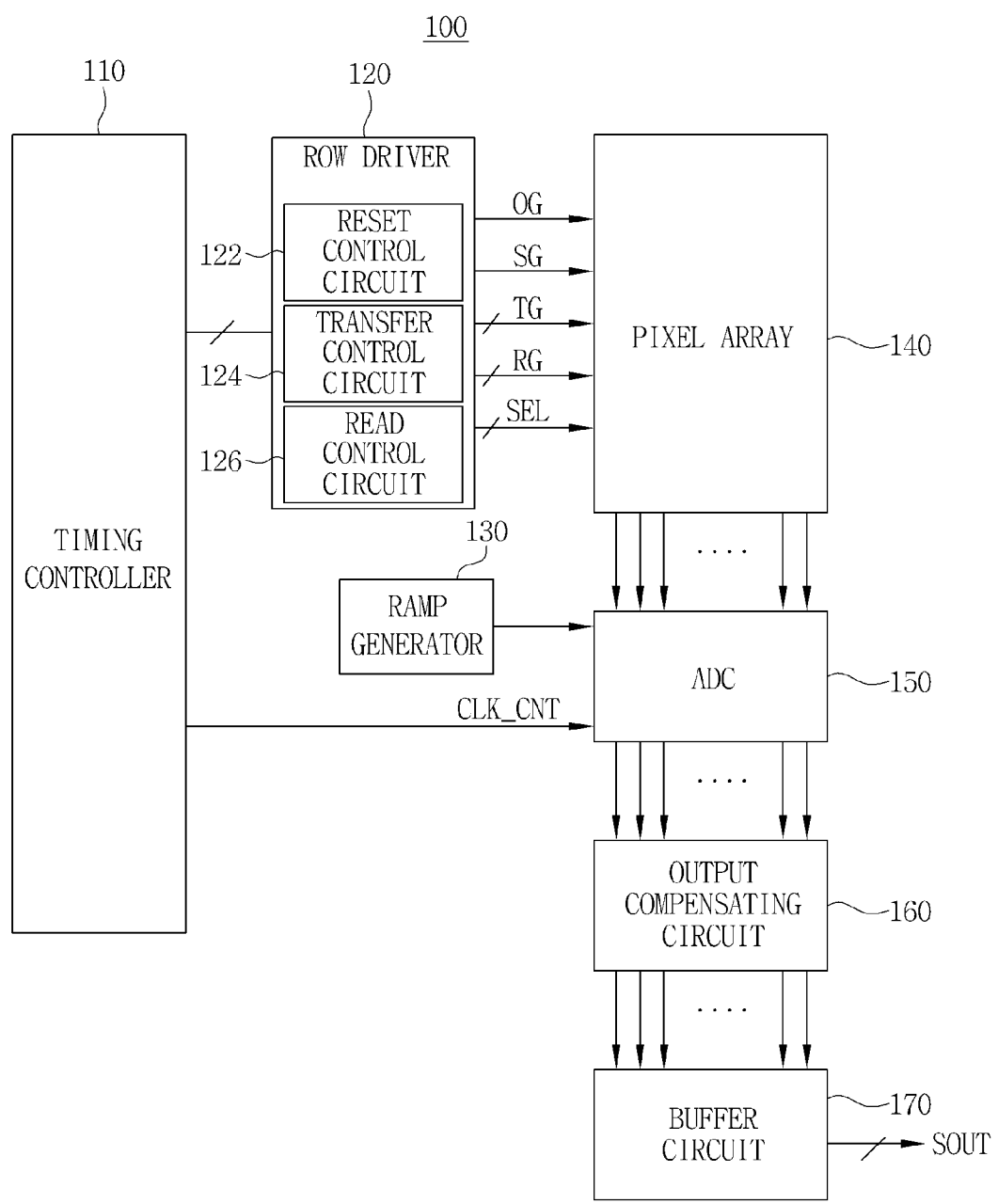
FIG. 1 is a block diagram illustrating an image sensor in accordance with an exemplary embodiment.

Specific structural and functional details disclosed herein are merely representative for purposes of describing exemplary embodiments of the present inventive concept. However, exemplary embodiments may be embodied in many alternate forms and should not be construed as limited to exemplary embodiments set forth herein.

While the inventive concept is susceptible to various modifications and alternative forms, specific exemplary embodiments thereof are shown by way of example in the drawings and will herein be described in detail. It should be understood, however, that there is no intent to limit the inventive concept to the particular forms disclosed, but on the contrary, all modifications, equivalents, and alternatives falling within the spirit and scope of the inventive concept are covered.

It will be understood that, although the terms "first," "second," etc. may be used herein to describe various components, these components should not be limited by these terms. These terms are only used to distinguish one component from another component. Thus, a "first" component discussed below could be termed a "second" component and the "second" component discussed below could be termed the "first" component without departing from the teachings of the present inventive concept.

It will be understood that when an element is referred to as being "connected to," or "coupled with" another element, it can be directly on, connected, or coupled to the other element or intervening elements may be present. In contrast, when an element is referred to as being "directly connected to," or "directly coupled with" another element, there are no intervening elements present. The terminology used herein, that is, "~ between" and "directly ~ between" or "adjacent to ~" and "directly adjacent to ~" which explain a relationship between elements, will be understood as the same as above.

The terminology used herein is for the purpose of describing particular exemplary embodiments only and is not intended to be limiting of the present inventive concept. As used herein, the singular forms "a," "an," and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When it is possible to implement any exemplary embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

Hereinafter, the inventive concept will now be described more fully with reference to the accompanying drawings, in which exemplary embodiments are shown.

FIG. 1 is a block diagram illustrating an image sensor in accordance with an exemplary embodiment.

Referring to FIG. 1, an image sensor 100 may include a timing controller 110, a row driver 120, a ramp generator 130, a pixel array 140, an analog-to-digital converter (ADC) 150, an output compensating circuit 160 and a buffer circuit 170.

The timing controller 110 generates control signals to control operations of the row driver 120 and the ADC 150. The row driver 120 performs decoding for a reset operation, a transfer operation and a read operation, and generates control signals OG, SG, TG, RG, and SEL to control an operation of the pixel array 140 in response to control of the timing controller 110. The row driver 120 may include a reset control circuit 122 that controls the reset operation, a transfer control circuit 124 that controls the transfer operation, and a read control circuit 126 that controls the read operation.

The pixel array 140 performs the transfer operation for a current row while the read operation for a previous row is performed in a rolling shutter mode, and receives optical signals, converts the optical signals to electrical signals, and outputs the electrical signals as image signals in response to an overflow control signal OG, a transfer control signal TG, a reset control signal RG and the row selecting signal SEL. The pixel array 140 includes a plurality of pixels, and may include red pixels for converting light of the red spectral region to electrical signals, green pixels for converting light of the green spectral region to electrical signals, and blue pixels for converting light of the blue spectral region to electrical signals.

The ramp generator 130 generates a ramp signal. The ADC 150 receives image signals in an analog form from the pixel array 140 in response to the ramp signal and a clock signal CLK_CNT received from the timing controller 110, and performs an analog-to-digital conversion on the image signals and generates first signals. The ADC 150 may convert analog signals to digital signals using a correlated double sampling (CDS) method. However, the present inventive concept is not limited to this method, and other methods for converting the analog signals to digital signals are contemplated and may be used. The output compensating circuit 160 may correct errors of output data of the ADC 150. The buffer circuit 170 latches and amplifies output signals of the output compensating circuit 160 to generate sensor output signals SOUT.

In the image sensor 100, in a global shutter mode, each of the reset operation and the transfer operation may be performed at the same time on the previous row and the current row, and the read operation may be performed on the current row after the read operation for the previous row is completed.

In the image sensor 100, in the rolling shutter mode, the reset operation of a second frame may be performed before the read operation of a first frame is completed. In the image sensor 100, in the rolling shutter mode, while the read operation of the first frame is performed on the last row, a transfer operation of a second frame may be performed on the first row and the reset operation of the second frame is performed on a third row. In the image sensor 100, in the rolling shutter mode, an operation of charge integration of a second frame may be performed on the second row while the read operation of the first frame is performed on the last row of a first frame. In the image sensor 100, in the rolling shutter mode, the reset operation of the second frame may be performed on the second row while the transfer operation of the first frame is performed on the last row of the first frame. In the image sensor 100, in the rolling shutter mode, the reset operation of the second frame may be performed on the first row while the charge integration of the first frame is performed on the last row of the first frame. In the image sensor 100, in the rolling shutter mode, the read operation may be performed on the second row after the read operation for the first row is completed, and the read operation may be performed on a third row after the read operation for the second row is completed.

Figure 2:
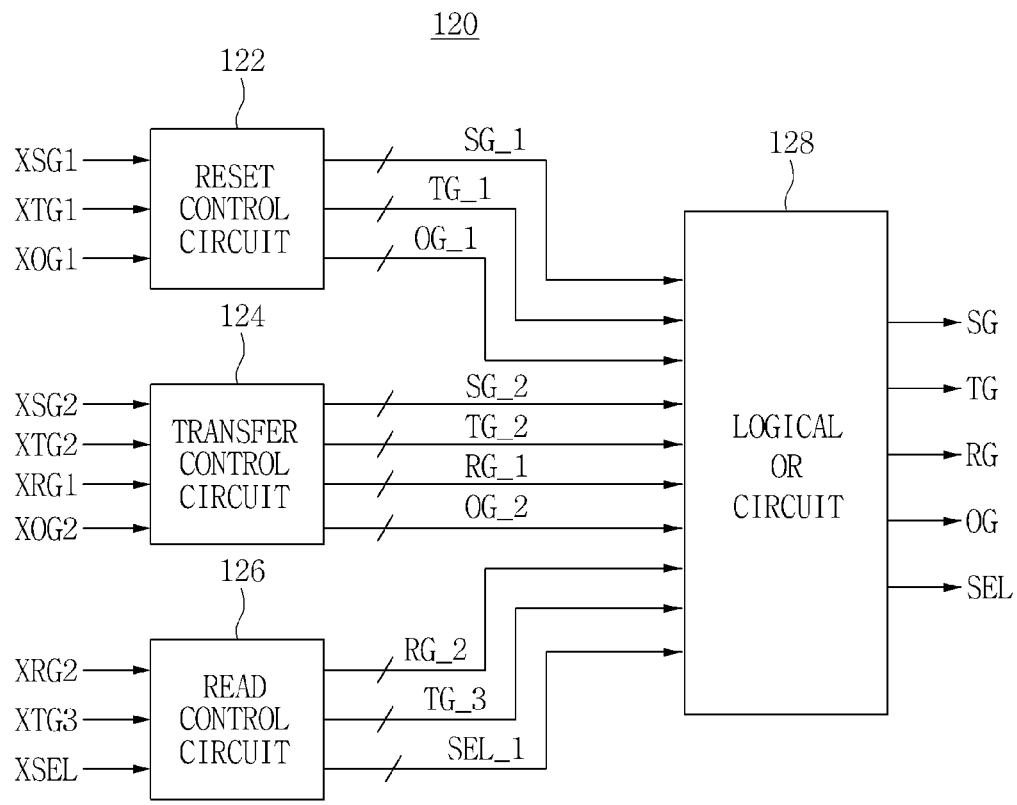
FIG. 2 is a block diagram illustrating a row driver included in the image sensor of FIG. 1, in accordance with an exemplary embodiment.

FIG. 2 is a block diagram illustrating a row driver included in the image sensor of FIG. 1, in accordance with an exemplary embodiment.

Referring to FIG. 2, the row driver 120 may include the reset control circuit 122 that controls the reset operation, the transfer control circuit 124 that controls the transfer operation, the read control circuit 126 that controls the read operation, and a logical OR circuit 128 that performs a logical OR operation on output signals of the reset control circuit 122, output signals of the transfer control circuit 124, and output signals of the read control circuit 126.

Figure 3:
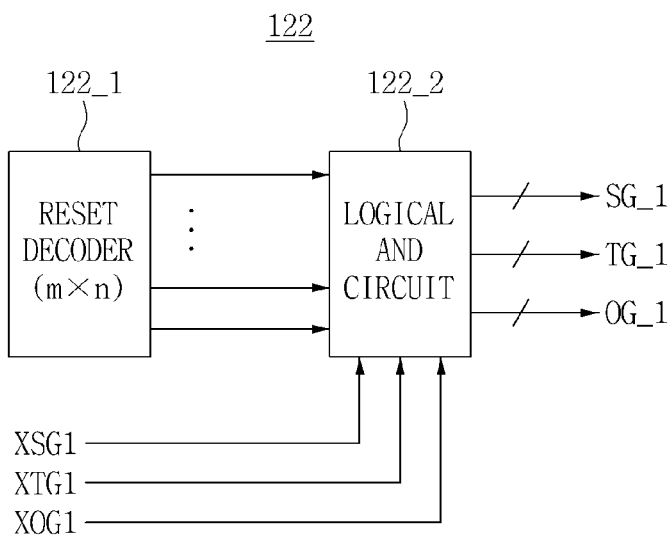
FIGS. 3 to 5 are block diagrams illustrating a reset control circuit, a transfer control circuit and a read control circuit, respectively, included in the row driver of FIG. 2 according to an exemplary embodiment.
Figure 4:
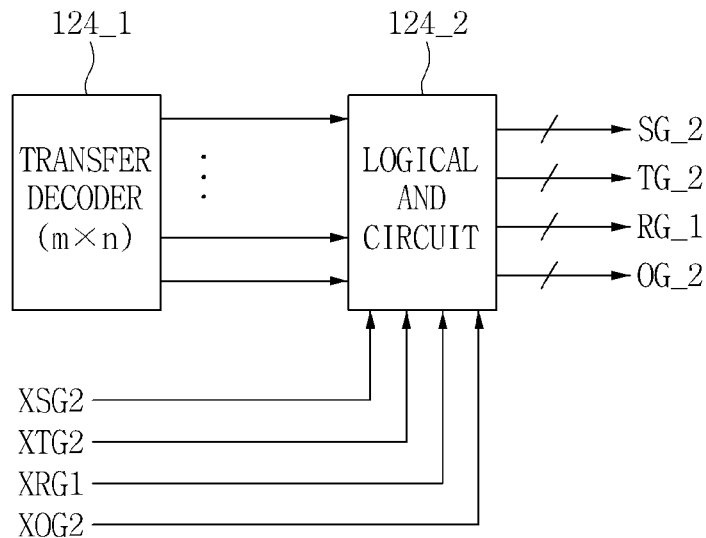
Figure 5:
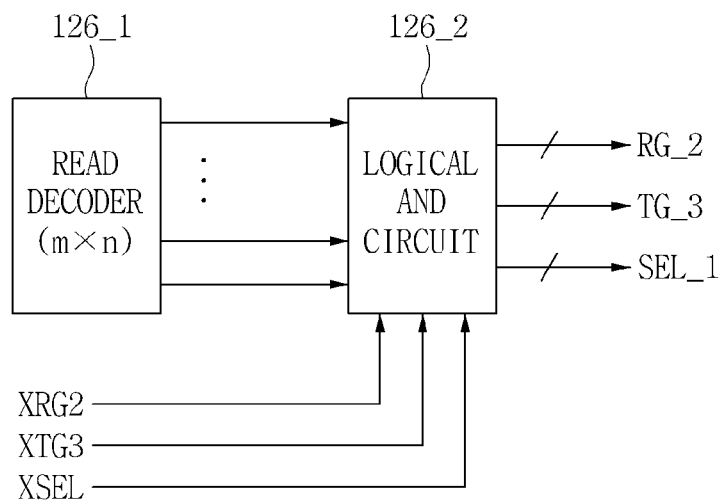

FIGS. 3 to 5 are block diagrams illustrating a reset control circuit, a transfer control circuit and a read control circuit, respectively, included in the row driver of FIG. 2 according to an exemplary embodiment.

Referring to FIG. 3, the reset control circuit 122 may include a reset decoder 122_1 and a logical AND circuit 122_2.

The reset decoder 122_1 decodes m signals to generate n pulse signals (n=2$^m$). The logical AND circuit 122_2 performs a logical AND operation on output signals of the reset decoder 122_1 and each of a first storage control signal XSG1, a first transfer control signal XTG1 and a first overflow control signal XOG1 to generate a first decoded storage control signal SG_1, a first decoded transfer control signal TG_1 and a first decoded overflow control signal OG_1, respectively.

For example, the first decoded storage control signal SG_1 having n bits may be generated by performing the logical AND operation on the first storage control signal XSG1 and the output signals of the reset decoder 122_1 which are n pulse signals. Further, the first decoded transfer control signal TG_1 having n bits may be generated by performing the logical AND operation on the first transfer control signal XTG1 and the output signals of the reset decoder 122_1 which are n pulse signals. Similarly, the first decoded overflow control signal OG_1 having n bits may be generated by performing the logical AND operation on the first overflow control signal XOG1 and the output signals of the reset decoder 122_1 which are n pulse signals.

Referring to FIG. 4, the transfer control circuit 124 may include a transfer decoder 124_1 and a logical AND circuit 124_2.

The transfer decoder 124_1 decodes m signals to generate n pulse signals (n=2$^m$). The logical AND circuit 124_2 performs a logical AND operation on output signals of the transfer decoder 124_1 and each of a second storage control signal XSG2, a second transfer control signal XTG2, a first reset control signal XRG1 and a second overflow control signal XOG2 to generate a second decoded storage control signal SG_2, a second decoded transfer control signal TG_2, a first decoded reset control signal RG_1 and a second decoded overflow control signal OG_2, respectively.

For example, the second decoded storage control signal SG_2 having n bits may be generated by performing the logical AND operation on the second storage control signal XSG2 and the output signals of the transfer decoder 124_1 which are n pulse signals. Further, the second decoded transfer control signal TG_2 having n bits may be generated by performing the logical AND operation on the second transfer control signal XTG2 and the output signals of the transfer decoder 124_1 which are n pulse signals. Further, the first decoded reset control signal RG_1 having n bits may be generated by performing the logical AND operation on the first reset control signal XRG1 and the output signals of the transfer decoder 124_1 which are n pulse signals. Similarly, the second decoded overflow control signal OG_2 having n bits may be generated by performing the logical AND operation on the second overflow control signal XOG2 and the output signals of the transfer decoder 124_1 which are n pulse signals.

Referring to FIG. 5, the read control circuit 126 may include a read decoder 126_1 and a logical AND circuit 126_2.

The read decoder 126_1 decodes m signals to generate n pulse signals (n=2$^m$). The logical AND circuit 126_2 performs a logical AND operation on output signals of the read decoder 126_1 and each of a second reset control signal XRG2, a third transfer control signal XTG3 and a first row selecting signal XSEL to generate a second decoded reset control signal RG_2, a third decoded transfer control signal TG_3 and a first decoded row selecting signal SEL_1, respectively.

For example, the second decoded reset control signal RG_2 having n bits may be generated by performing the logical AND operation on the second reset control signal XRG2 and the output signals of the read decoder 126_1 which are n pulse signals. Further, the third decoded transfer control signal TG_3 having n bits may be generated by performing the logical AND operation on the third transfer control signal XTG3 and the output signals of the read decoder 126_1 which are n pulse signals. Further, the first decoded row selecting signal SEL_1 having n bits may be generated by performing the logical AND operation on the first row selecting signal XSEL and the output signals of the read decoder 126_1 which are n pulse signals.

Referring back to FIG. 2, the logical OR circuit 128 may perform a logical OR operation on output signals of the reset control circuit 122, a transfer control circuit 124 and the read control circuit 126, and generate the storage control signal SG, the transfer control signal TG, the reset control signal RG, the overflow control signal OG and the row selecting signal SEL.

For example, the storage control signal SG may be generated by performing the logical OR operation on the first decoded storage control signal SG_1 which is an output signal of the reset control circuit 122 and the second decoded storage control signal SG_2 which is an output signal of the transfer control circuit 124. Further, the transfer control signal TG may be generated by performing the logical OR operation on the first decoded transfer control signal TG_1 which is an output signal of the reset control circuit 122, the second decoded transfer control signal TG_2 which is an output signal of the transfer control circuit 124, and the third decoded transfer control signal TG_3 which is an output signal of the read control circuit 126.

Figure 6:
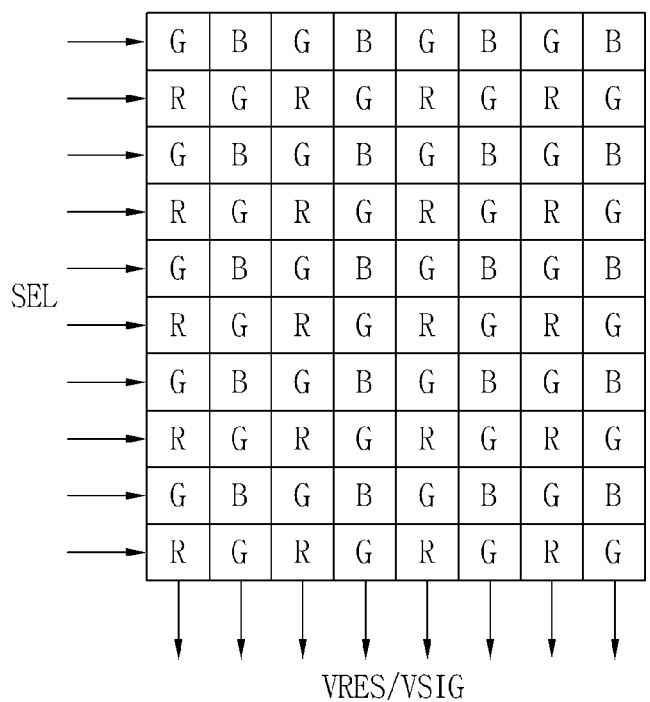
FIG. 6 is a diagram illustrating a color filter pattern of a pixel array included in the image sensor of FIG. 1, in accordance with an exemplary embodiment.

FIG. 6 is a diagram illustrating a color filter pattern of a pixel array included in the image sensor of FIG. 1, in accordance with an exemplary embodiment.

FIG. 6 shows the color filter pattern of the pixel array 140. Referring to FIG. 6, a color filter may be disposed on each pixel included in the pixel array 140 to receive only light of a particular color. For example, three kinds of color filters may be disposed on each pixel included in the pixel array 140. Generally, the color filters may be disposed in a Bayer pattern in which a first pattern having two colors of green G and blue B are disposed in a row and a second pattern having two colors of red R and green G are disposed in the next row. The green color G related to brightness may be disposed in all rows, and the red color R and the blue color B may be alternately and diagonally disposed in each row to enhance resolution.

In the image sensor 100 having a pixel structure as described above, the pixel array 140 senses light by a photo diode, and converts the light into electrical signals to generate image signals.

Figure 7:
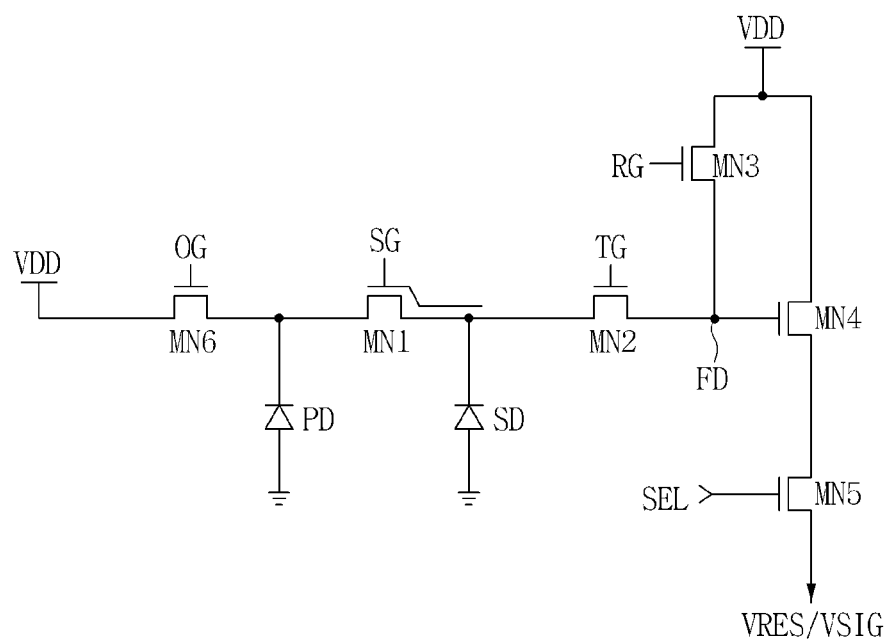
FIG. 7 is a circuit diagram illustrating a pixel driving circuit that drives a unit pixel of a pixel array included in the image sensor of FIG. 1, in accordance with an exemplary embodiment.

FIG. 7 is a circuit diagram illustrating a pixel driving circuit that drives a unit pixel of a pixel array included in the image sensor of FIG. 1, in accordance with an exemplary embodiment.

Referring to FIG. 7, the pixel driving circuit may include a photo diode PD, a storage diode SD and NMOS transistors MN1, MN2, MN3, MN4, MN5 and MN6. The first NMOS transistor MN1 is referred to as a storage transistor, operates in response to the storage control signal SG, and transfers charges generated in the photo diode PD to the storage diode SD. A cathode of the storage diode SD may serve as a storage diode region. The second NMOS transistor MN2 is referred to as a transfer transistor, operates in response to the transfer control signal TG, and transfers charges accumulated in the storage diode SD to a floating diffusion node FD. The third NMOS transistor MN3 is referred to as a reset transistor, operates in response to the reset control signal RG, and resets the floating diffusion node FD using a supply voltage VDD. The fourth NMOS transistor MN4 is referred to as a driving transistor, operates in response to a voltage of the floating diffusion node FD, and outputs an electrical signal that is proportional to an amount of charge transferred from the storage diode SD to the floating diffusion node FD. The fifth NMOS transistor MN5 is referred to as a selecting transistor, operates in response to the row selecting signal SEL, and transmits an output signal of the fourth NMOS transistor MN4 to the ADC 150. The NMOS transistor MN6 operates in response to an overflow control signal OG, and may serve to prevent charge in the photo diode region, that is, a cathode of the photo diode PD, from overflowing. Referring to FIG. 7, the gate terminal of the first NMOS transistor MN1 covers a surface of the storage diode SD in a semiconductor integrated circuit.

The pixel driving circuit of FIG. 7 may operate in a rolling shutter mode or a global shutter mode according to states of control signals OG, SG, TG, RG and SEL. In the rolling shutter mode, signals photoelectric-converted from the photo diodes PD of each row in one frame are sequentially selected, and transferred to the floating diffusion nodes FD, and corresponding image signals are output. In the global shutter mode, signals photoelectric-converted from the photo diodes PD of all the rows in one frame are transferred to the storage diodes SD at once, and then sequentially transferred to the floating diffusion nodes FD.

When the pixel driving circuit of FIG. 7 operates in the rolling shutter mode or in the global shutter mode, a signal of the floating diffusion node FD transferred from the supply voltage VDD is output as a reset signal VRES after the reset control signal RG in the pixel selected by the row selecting signal SEL is disabled, and a signal transferred from the photo diode PD to the floating diffusion node FD is output as an image signal VSIG when the transfer control signal TG is enabled. Generally, in the rolling shutter mode, the image signal is output after the reset signal VRES is output. When the analog-to-digital conversion is performed using a correlated double sampling (CDS) method, the ADC 150 may convert an image signal VSIG having an analog form into a digital signal based on a difference between the image signal VSIG and the reset signal VRES. The control signals OG, SG, TG, RG and SEL applied to the pixel driving circuit may be generated by the row driver 120 in FIG. 1.

Figure 8:
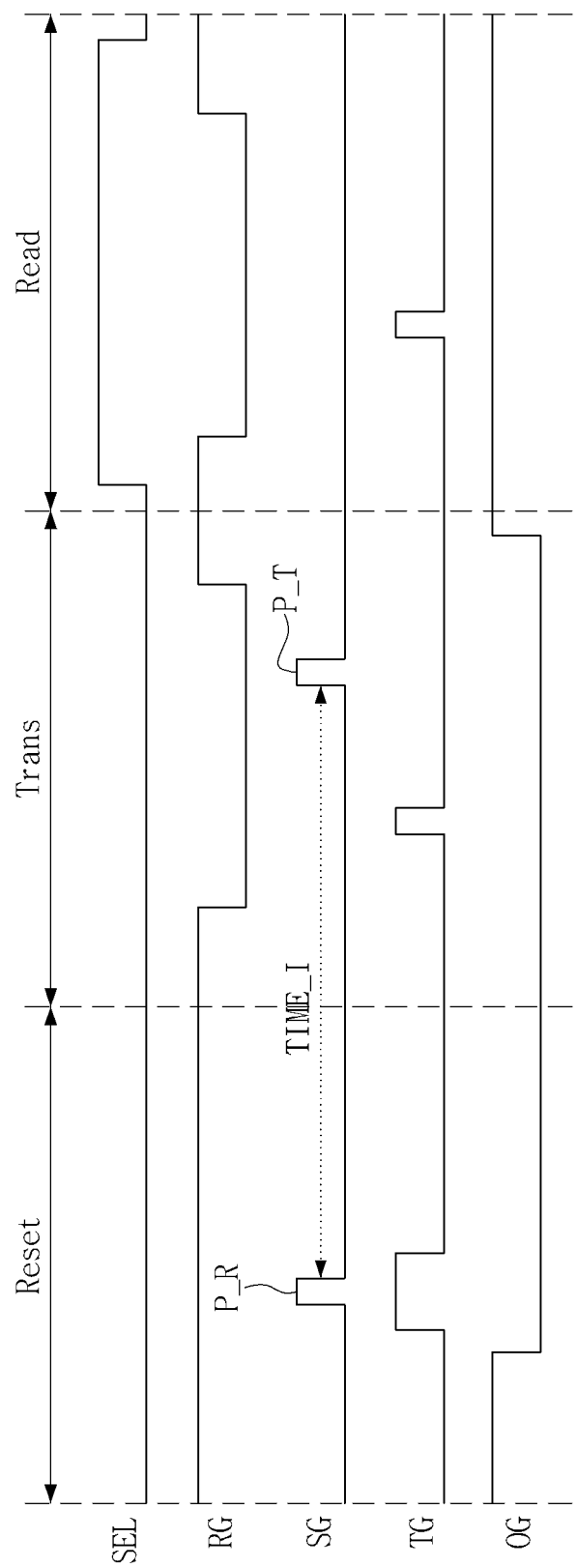
FIG. 8 is a timing diagram illustrating a process of outputting data from a pixel array included in the image sensor of FIG. 1, in accordance with an exemplary embodiment.
Figure 9:
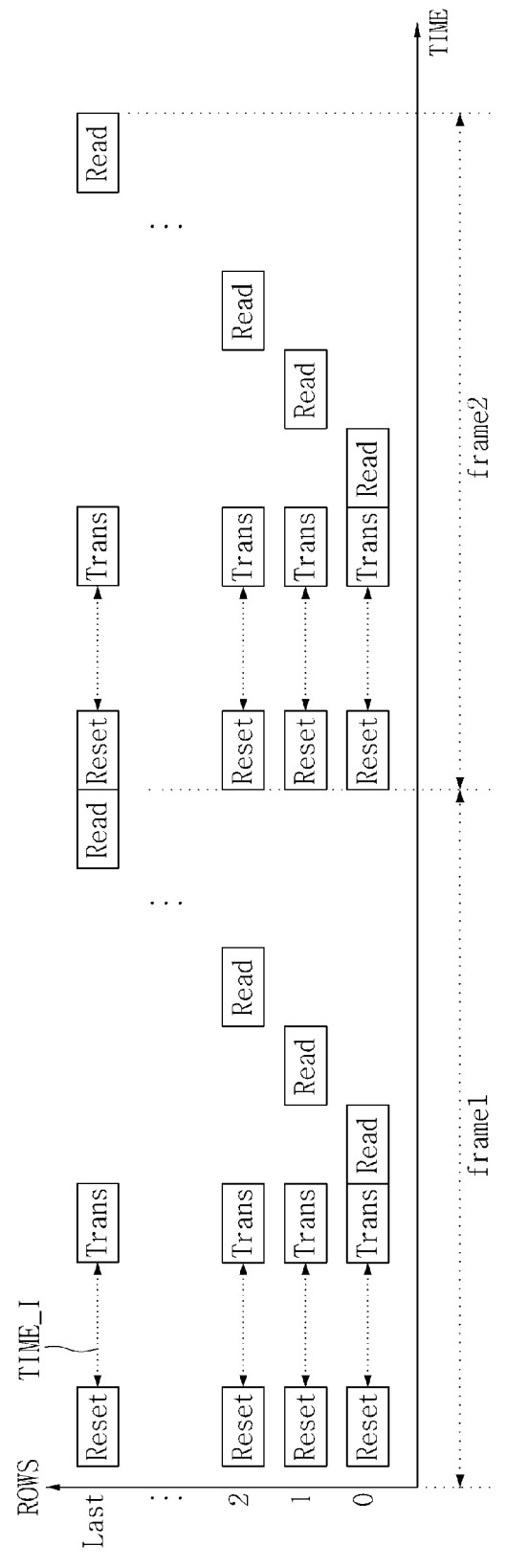
FIG. 9 is a diagram illustrating an operation of the image sensor of FIG. 1 in a global shutter mode, in accordance with an exemplary embodiment.

FIG. 8 is a timing diagram illustrating a process of outputting data from a pixel array included in the image sensor of FIG. 1, and FIG. 9 is a diagram illustrating an operation of the image sensor of FIG. 1 in a global shutter mode.

Referring to FIGS. 7 and 8, the reset operation Reset may be performed when RG, SG and TG are enabled and SEL and OG are disabled. That is, in FIG. 7, the reset operation Reset may be performed when MN3, MN2 and MN1 are turned on. The transfer operation Trans may be performed when SG is enabled and RG, TG, SEL and OG are disabled. That is, in FIG. 7, electrons generated by the photo diode PD are transferred to the storage diode SD when MN1 is turned on. The read operation Read may include a read operation of the reset signal VRES and a read operation of an image signal VSIG. When SEL and OG are enabled and RG, SG and TG are disabled, the reset signal VRES are read, and then the image signal VSIG is read after TG is enabled. That is, in FIG. 7, when MN5, MN3 and MN6 are in on states, the read operation of the reset signal VRES is performed after MN3 is turned off, and in this condition, the read operation of the image signal VSIG is performed after MN2 is turned off. As described above, the storage control signal SG may be generated by performing a logical OR operation on the first decoded storage control signal SG_1 which is an output signal of the reset control circuit 122 and the second decoded storage control signal SG_2 which is an output signal of the transfer control circuit 124. A pulse P_R included in the storage control signal SG may correspond to a pulse included in the first decoded storage control signal SG_1, and a pulse P_T may correspond to a pulse included in the second decoded storage control signal SG_2.

Referring to FIG. 9, in the image sensor 100, in the global shutter mode, each of the reset operation Reset and the transfer operation Trans may be performed at the same time on the previous row and the current row, and the read operation Read may be performed on the current row after the read operation for the previous row is completed. That is, in the global shutter mode, the reset operation Reset and the transfer operation Trans may be performed at the same time on rows 0, 1, 2, . . . , to Last, and the read operation Read may be sequentially performed on the rows 0, 1, 2, . . . , to Last. In the global shutter mode, the reset operation of a second frame (frame2) may be performed after the read operation of a first frame (frame1) is completed. A charge integration time TIME_I for a charge generated by light in the photo diode PD to be accumulated may exist between the reset operation Reset and the transfer operation Trans.

Figure 10:
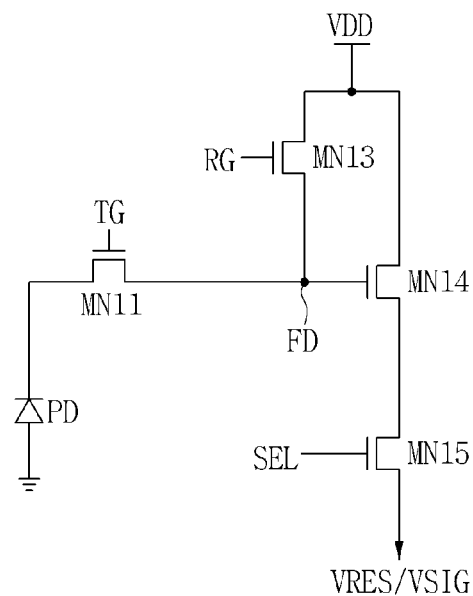
FIG. 10 is a circuit diagram illustrating a pixel driving circuit of a related art image sensor that operates in a rolling shutter mode.

FIG. 10 is a circuit diagram illustrating a pixel driving circuit of a related art image sensor that operates in a rolling shutter mode according to an exemplary embodiment.

Referring to FIG. 10, the related art pixel driving circuit may include a photo diode PD and NMOS transistors MN11, MN13, MN14 and MN15. The related art pixel driving circuit shown in FIG. 10 does not include a transistor MN1 which transfers a charge from the photo diode PD to the storage diode SD and also does not include the storage diode SD, differently from the pixel driving circuit shown in FIG. 7.

Figure 11:
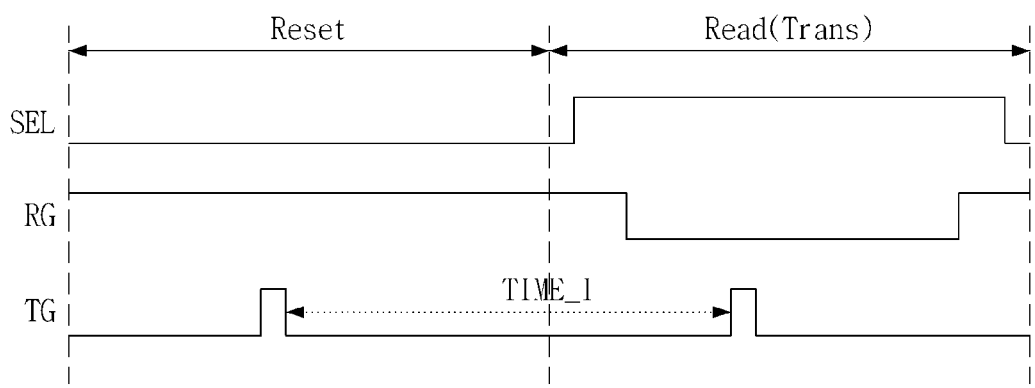
FIG. 11 is a timing diagram illustrating a process of outputting data from a pixel array driven by the pixel driving circuit of FIG. 10.
Figure 12:
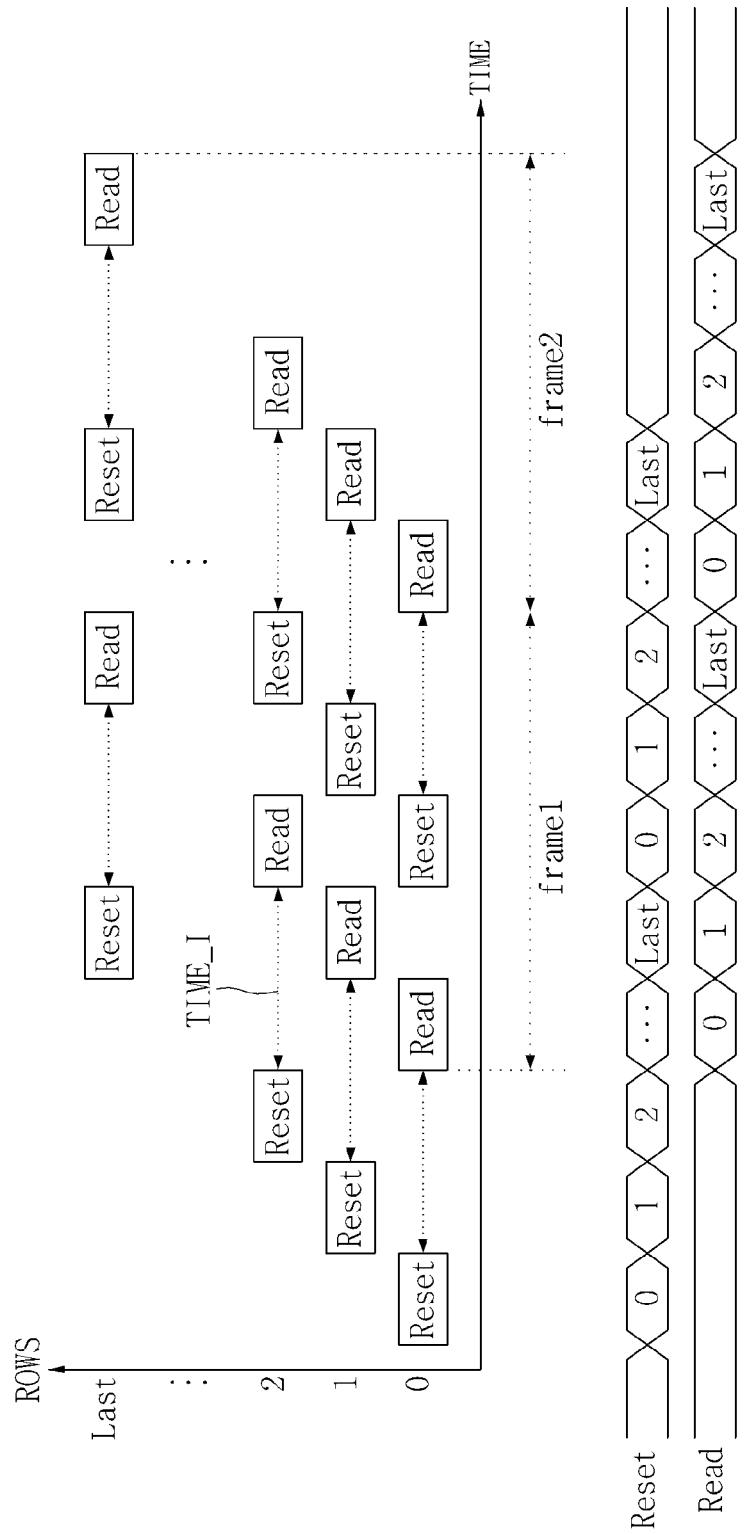
FIG. 12 is a diagram illustrating an operation of the image sensor that includes the pixel driving circuit of FIG. 10.

FIG. 11 is a timing diagram illustrating a process of outputting data from a pixel array driven by the pixel driving circuit of FIG. 10, and FIG. 12 is a diagram illustrating an operation of the image sensor that includes the pixel driving circuit of FIG. 10.

Referring to FIG. 11, an image sensor including the pixel driving circuit of FIG. 10 does not have a period of the transfer operation Trans, and when TG and SEL are enabled, the read operation Read is performed simultaneously with the transfer operation Trans. The reset operation Reset is performed when RG and TG are in on states.

Referring to FIG. 12, in the related art image sensor which is operated in the rolling shutter mode, the reset operation Reset and the read operation Read are respectively and sequentially performed on the rows 0 to Last, and the image sensor does not have the period of the transfer operation Trans. A charge integration time TIME_I for a charge generated by light in the photo diode PD to be accumulated may exist between the reset operation Reset and the read operation Read.

Referring to FIGS. 11 and 12, because the related art image sensor which is operated in the rolling shutter mode does not have the period of the transfer operation Trans, a time for outputting data may be short. However, the related art image sensor which is operated in the rolling shutter mode should perform the reset operation and the read operation row by row because the related art image sensor does not include the storage diode. Therefore, in the related art image sensor which is operated in the rolling shutter mode, a subject may be distorted when filming the video.

Figure 13:
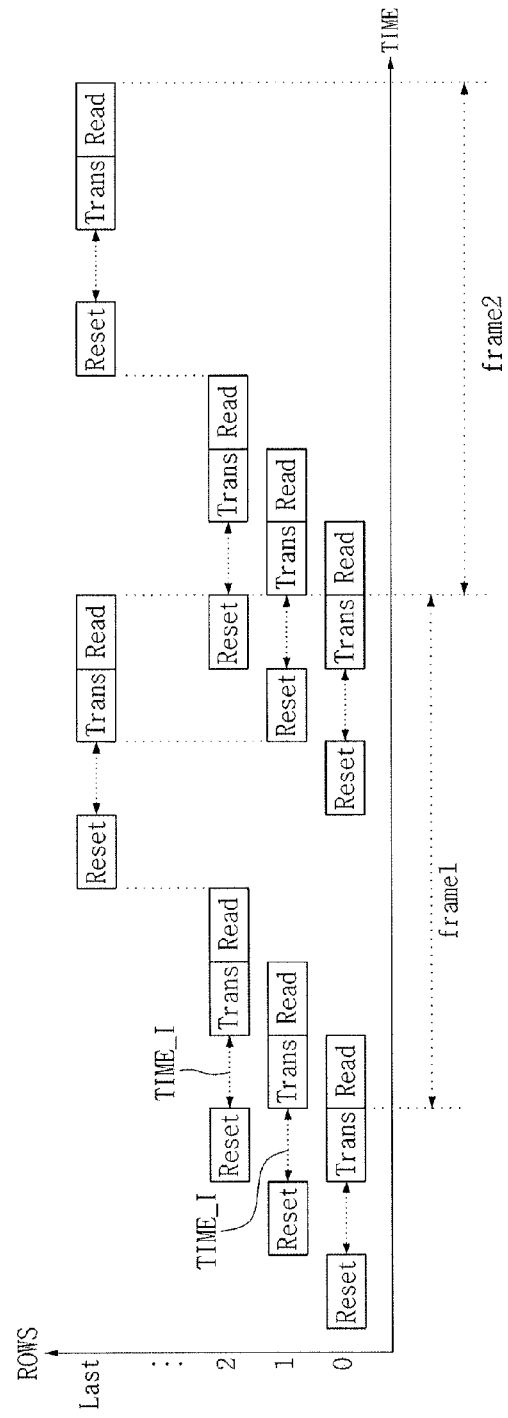
FIG. 13 is a diagram illustrating an operation of the image sensor of FIG. 1 in a rolling shutter mode, in accordance with an exemplary embodiment.
Figure 14:
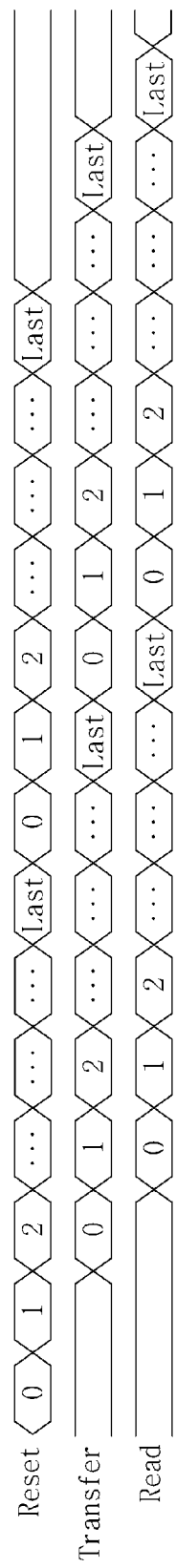
FIG. 14 is a timing diagram illustrating row addresses for the operation of an image sensor shown in FIG. 13.

FIG. 13 is a diagram illustrating an operation of the image sensor of FIG. 1 in a rolling shutter mode and FIG. 14 is a timing diagram illustrating row addresses for the operation of an image sensor of FIG. 13.

Referring to FIG. 13, in the image sensor 100 shown in FIG. 1, in the rolling shutter mode, the reset operation Reset, the transfer operation Trans and the read operation Read may be respectively and sequentially performed on the rows 0, 1, 2, . . . , to Last. The image sensor 100 may perform the reset operation Reset on a third row 2 and the operation of charge integration for a second row 1 while the transfer operation Trans is performed for a first row 0. That is, the reset operation of a third row 2, the transfer operation of a first row 0, and the charge integration time of a second row 1 may occur at the same time. A charge integration time TIME_I for a charge generated by light in the photo diode PD to be accumulated may exist between the reset operation Reset and the transfer operation Trans. Similarly, the image sensor 100 may perform the transfer operation Trans on the second row 1 and the operation of charge integration for a third row 2 while the read operation Read is performed on a first row 0.

The reset operation Reset of a second frame may be performed before the read operation Read of a first frame is completed. In the image sensor 100, in the rolling shutter mode, while the read operation Read is performed on the last row Last of the first frame frame1, a transfer operation Trans may be performed on the first row 0 of a second frame frame2 and a reset operation Reset on the a third row 2 of the second frame frame2 may be performed. In the image sensor 100, in the rolling shutter mode, an operation of charge integration on the second row 1 of a second frame frame2 may be performed while the read operation Read is performed on the last row Last of the first frame frame1. In the image sensor 100, in the rolling shutter mode, the reset operation Reset on the second row 1 of the second frame frame2 may be performed while the transfer operation Trans on the last row Last of the first frame frame1 is performed. In the image sensor 100, in the rolling shutter mode, the reset operation Reset on the first row 0 of the second frame frame2 may be performed while the charge integration on the last row Last of the first frame frame1 is performed. In the image sensor 100, in the rolling shutter mode, the read operation Read may be performed on the second row 1 after the read operation Read for the first row 0 is completed, and the read operation Read may be performed on a third row 2 after the read operation Read for the second row 1 is completed.

In FIG. 14, row addresses for the operation of an image sensor of FIG. 13 are shown, and an address for the reset operation, an address for the transfer operation, and an address for the read operation may be generated by the row driver 120 that includes the reset control circuit 122, the transfer control circuit 124 and the read control circuit 126.

Figure 15:
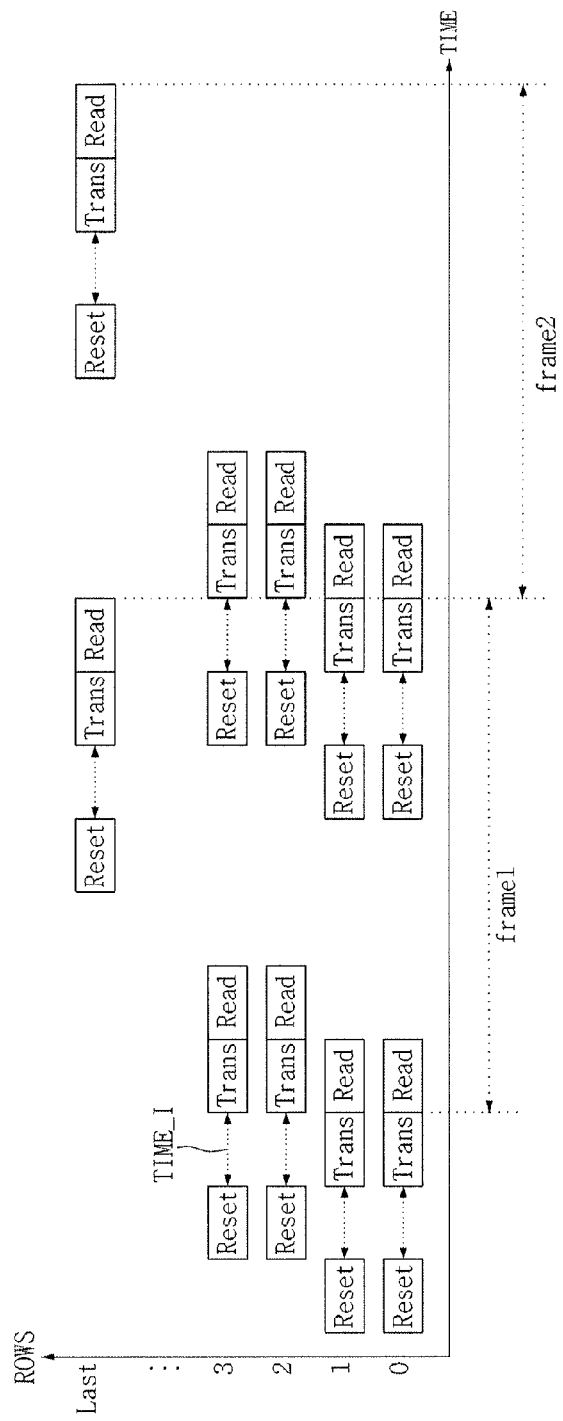
FIG. 15 is a diagram illustrating an operation of the image sensor of FIG. 1 in a rolling shutter mode, in accordance with another exemplary embodiment.

FIG. 15 is a diagram illustrating an operation of the image sensor of FIG. 1 in a rolling shutter mode, in accordance with another exemplary embodiment.

Referring to FIG. 15, in the image sensor 100 shown in FIG. 1, in the rolling shutter mode, the reset operation Reset, the transfer operation Trans and the read operation Read may be respectively and sequentially performed multiple rows at one time on the rows 0 to Last. For example, FIG. 15 shows two rows at one time. However, this is only an example. As shown in FIG. 15, the image sensor 100 may perform the operation of charge integration on the third row 2 and the fourth row 3 while the transfer operation Trans is performed on the first row 0 and a second row 1. A charge integration time TIME_I for a charge generated by light in the photo diode PD to be accumulated may exist between the reset operation Reset and the transfer operation Trans. The image sensor 100 may perform the transfer operation Trans on the third row 2 and the fourth row 3 while the read operation Read is performed on the first row 0 and a second row 1.

The reset operation Reset of a second frame frame2 may be performed before the read operation Read of a first frame frame1 is completed, and in the rolling shutter mode the transfer operation on the first row 0 and the second row 1 of a second frame frame2 may be performed while the read operation Read on a last row Last of a first frame frame1 is performed. In the rolling shutter mode, the operation of charge integration on the third row 2 and the fourth row 3 of the second frame frame2 may be performed while the read operation Read in a last row Last of a first frame frame1 is performed. In the rolling shutter mode, the reset operation Reset on the third row 2 and the fourth row 3 of the second frame frame2 may be performed while the transfer operation Trans on a last row Last of a first frame frame1 is performed. In the rolling shutter mode, the reset operation Reset on the first row 0 and the second row 1 of the second frame frame2 may be performed while the operation of charge integration on a last row Last of a first frame frame1 is performed. In the rolling shutter mode, the image sensor 100 may perform the read operation Read on the third row 2 and the fourth row 3 after the read operation Read on the first row 0 and the second row 1 is completed, and may perform the read operation Read on a fifth row and a sixth row after the read operation Read for the third row 2 and the fourth row 3 is completed.

That is, in the rolling shutter mode, the image sensor 100 may perform the transfer operation Trans on the second row group while the read operation Read is performed on the first row group. Further, in a global shutter mode, each of the reset operation Reset and the transfer operation Trans may be performed at the same time on the first row group and the second row group, and the read operation Read may be performed on the second row group after the read operation Read for the first row group is completed. Each of the first row group and the second row group may include one or more rows. Further, each of the first row group and the second row group may include one row, two rows, four rows or eight rows.

FIGS. 16 to 19 are flow charts illustrating methods of outputting data from an image sensor according to exemplary embodiments.

Figure 16:
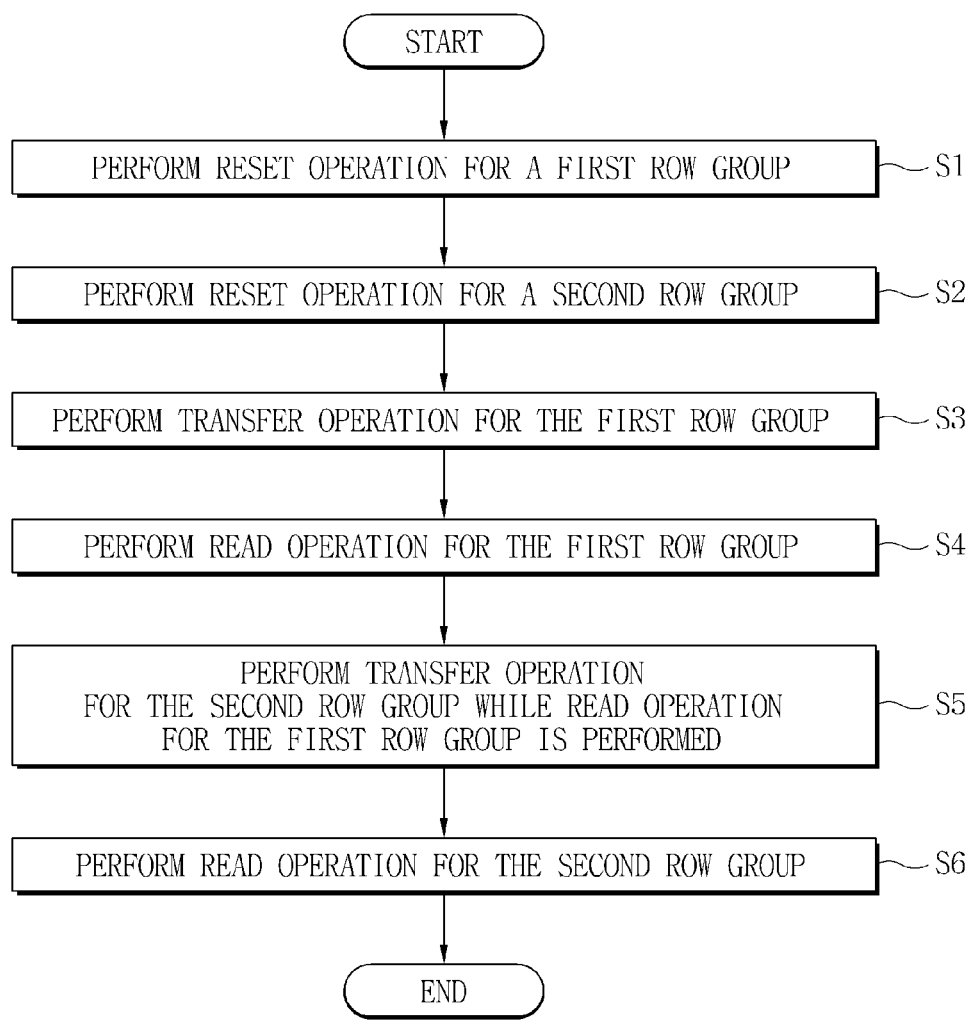
FIGS. 16 to 19 are flow charts illustrating methods of outputting data from an image sensor according to exemplary embodiments.

Referring to FIG. 16, a method of outputting data from an image sensor in accordance with the exemplary embodiment may include the following operations in a rolling shutter mode:

(1) perform a reset operation on a first row group (S1)

(2) perform a reset operation on a second row group (S2)

(3) perform a transfer operation on the first row group (S3)

(4) perform a read operation on the first row group (S4)

(5) perform the transfer operation on the second row group while the read operation for the first row group is performed (S5). Here, it is noted that FIG. 16 shows an apparent linear progression of operations S3, S4, S5 and S6. However, as stated in operation S5, the transfer operation on the second row group is performed while the read operation for the first row group is performed. The transfer operation on the second row group may start at the same time as the read operation for the first row group starts, or the transfer operation on the second row group may start after the read operation for the first row group has begun. That is, some portion of the transfer operation may overlap with the read operation.

(6) perform the read operation on the second row group (S6)

Figure 17:
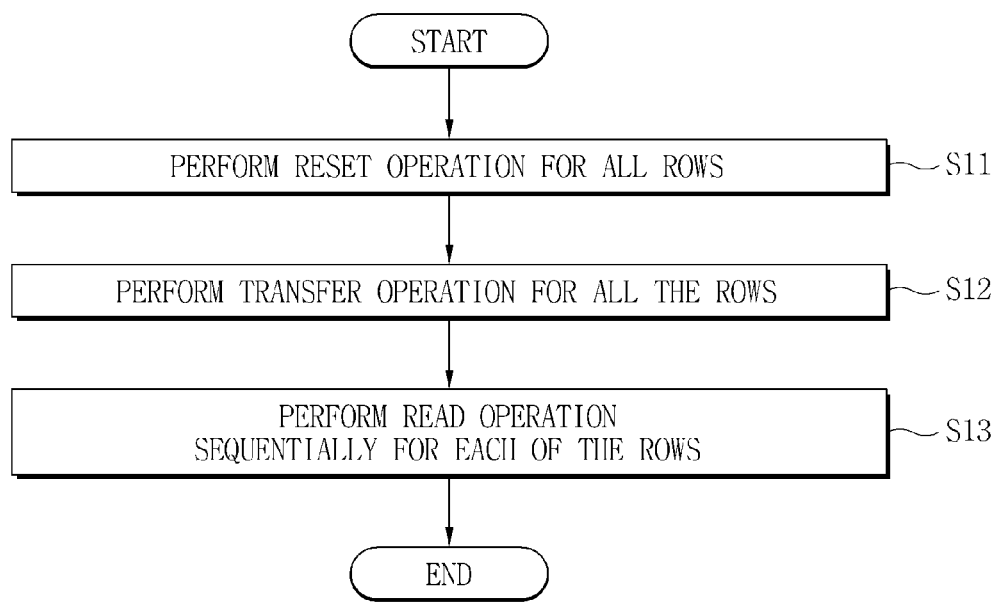

Referring to FIG. 17, a method of outputting data from an image sensor in accordance with an exemplary embodiment may include the following operations in a global shutter mode:

(1) perform the reset operation on all rows (S11)

(2) perform the transfer operation on all the rows (S12)

(3) sequentially perform the read operation on each of the rows (S13)

Each of the first row group and the second row group may include one or more rows. Further, each of the first row group and the second row group may include one row, two rows, four rows or eight rows.

Figure 18:
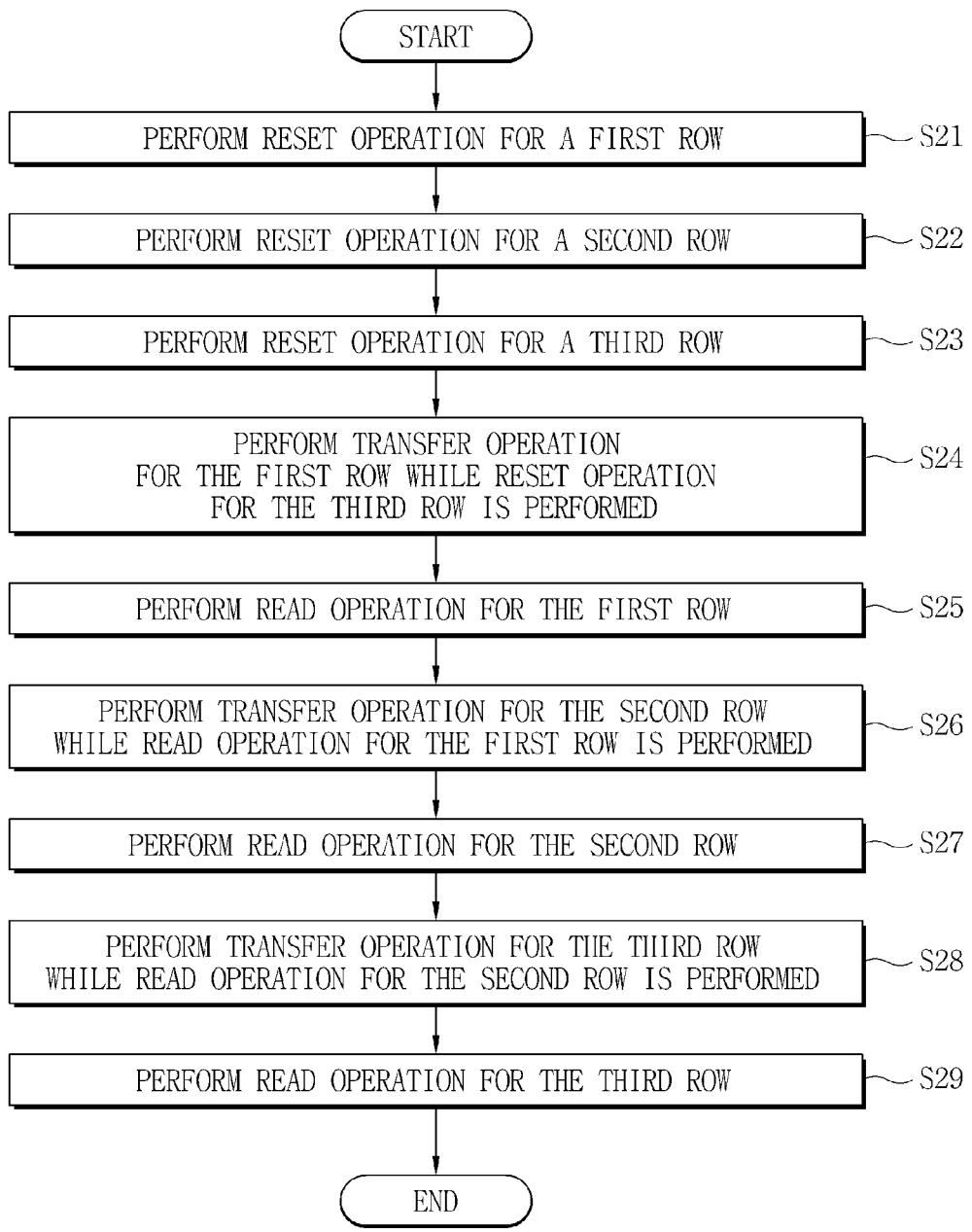

Referring to FIG. 18, a method of outputting data from an image sensor in accordance with an exemplary embodiment may include the following operations in a rolling shutter mode:

(1) perform a reset operation on a first row (S21)

(2) perform a reset operation on a second row (S22)

(3) perform a reset operation on a third row (S23)

(4) perform a transfer operation on the first row while the reset operation for the third row is performed (S24). Here, it is noted that FIG. 18 shows an apparent linear progression of operations S22, S23, S24, and S25. However, as stated in operation S24, the transfer operation on the first row group is performed while the reset operation for the third row is performed. For example, the transfer operation on the first row may start at the same time as the reset operation for the third row starts, or the transfer operation on the first row may start after the reset operation for the third row has begun. That is, some portion of the transfer operation may overlap with the reset operation.

(5) perform a read operation on the first row (S25)

(6) perform a transfer operation on the second row while the read operation for the first row is performed (S26). Similar to operation S24, some portion of the transfer operation may overlap with the read operation. For example, the transfer operation may start at the same time as the read operation, or the transfer operation may start after the read operation has begun.

(7) perform a read operation on the second row (S27)

(8) perform a transfer operation on the third row while the read operation for the second row is performed (S28). Similar to operations S24 and S26, some portion of the transfer operation may overlap with the read operation. For example, the transfer operation may start at the same time as the read operation, or the transfer operation may start after the read operation has begun.

(9) perform a read operation on the third row (S29)

Figure 19:
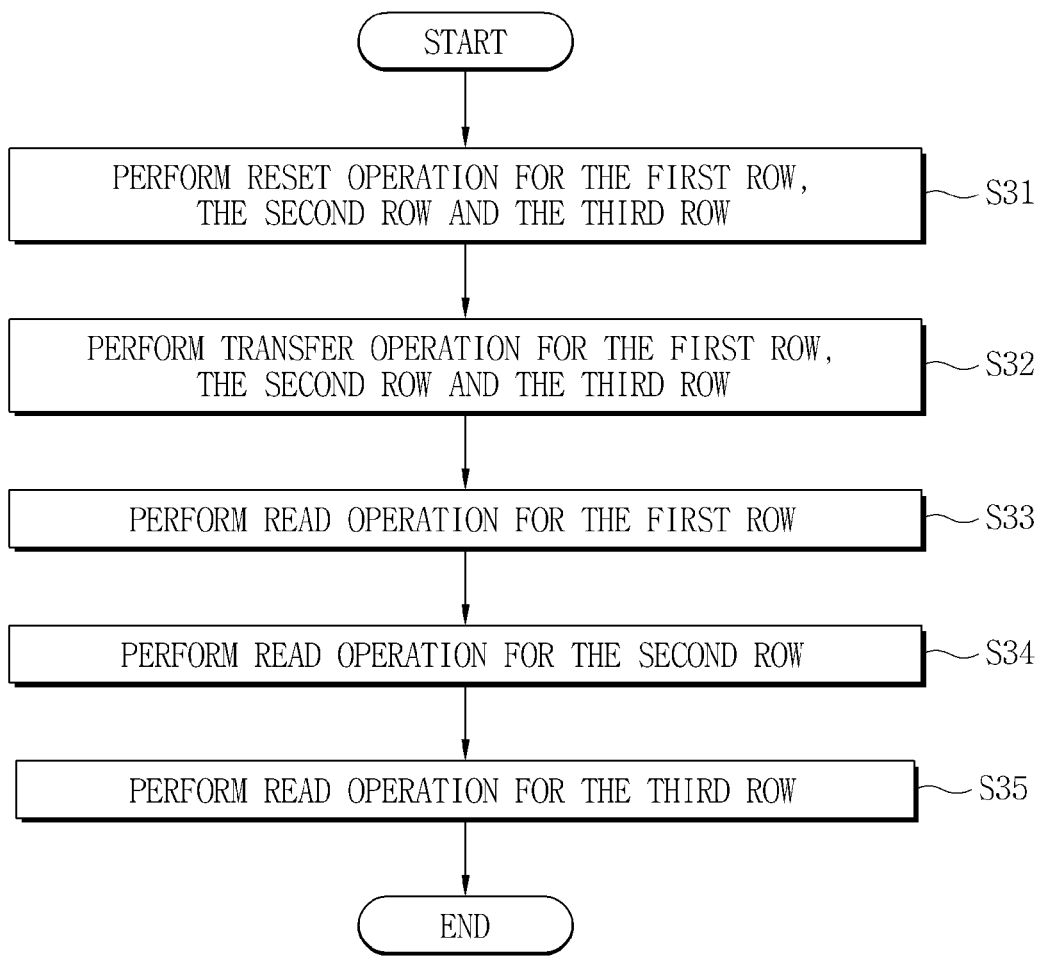

Referring to FIG. 19, a method of outputting data from an image sensor in accordance with an exemplary embodiment may include the following operations in a global shutter mode:

(1) perform a reset operation on the first row, the second row and the third row (S31)

(2) perform a transfer operation on the first row, the second row and the third row (S32)

(3) perform a read operation on the first row (S33)

(4) perform a read operation on the second row (S34)

(5) perform a read operation on the third row (S35)

Figure 20:
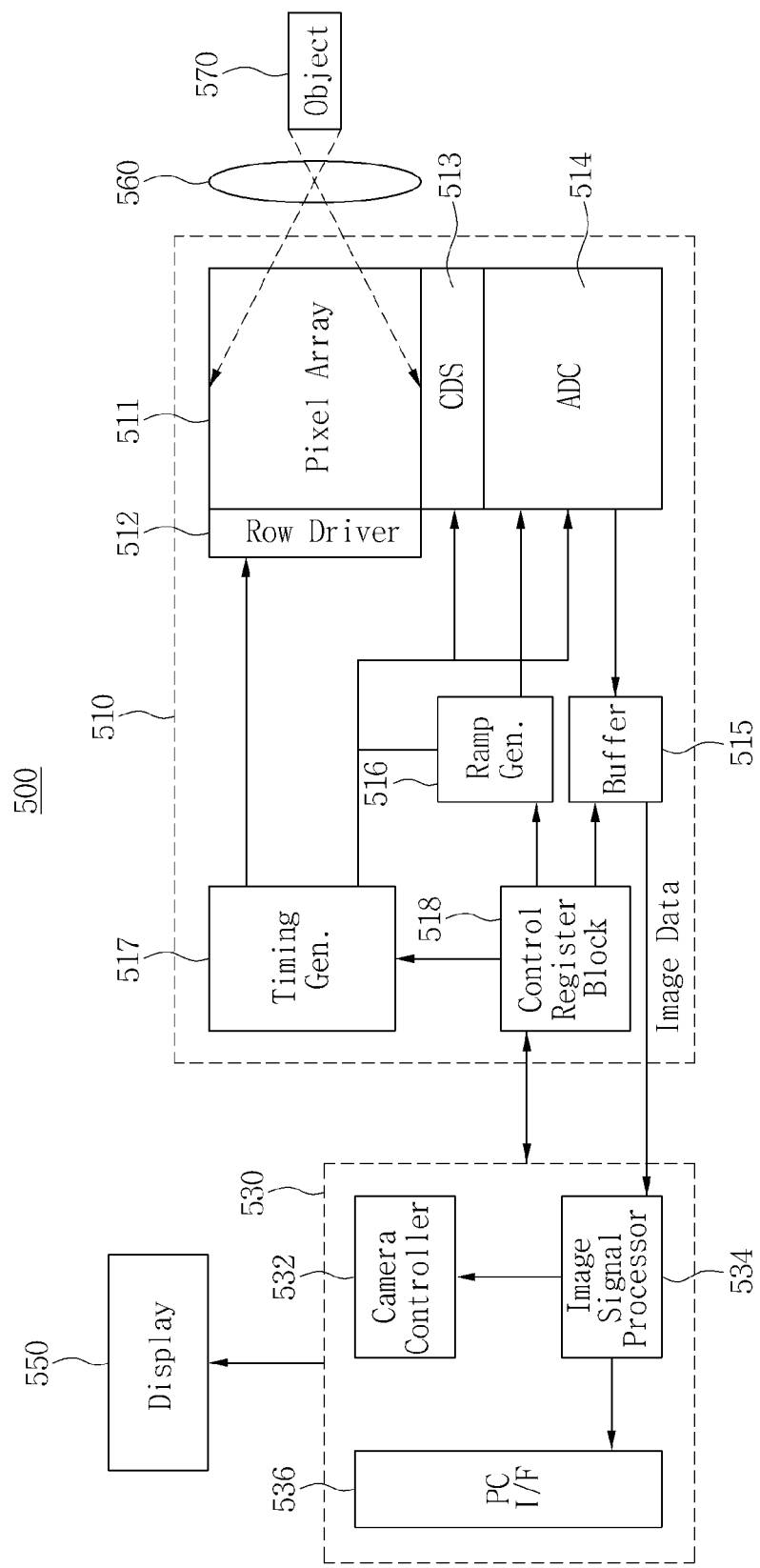
FIG. 20 is a block diagram illustrating an image processing device including the image sensor of FIG. 1 in accordance with an exemplary embodiment.

FIG. 20 is a block diagram illustrating an image processing device including the image sensor of FIG. 1 in accordance with an exemplary embodiment.

Referring to FIG. 20, an image processing device 500 may include an image sensor 510, an image processor 530, a display 550, and an optical lens 560.

The image processing device 500 may be implemented as a digital camera, a data processing device that includes the digital camera, such as a personal computer (PC), a mobile phone, a smart phone, a tablet PC, or an information technology (IT) device. The digital camera may be a digital single-lens reflex (DSLR) camera.

The image sensor 510 converts an optical image of an object 570, which is input through the optical lens 560 under control of the image processor 530, to an electrical image signal.

The image sensor 510 may include a control register block 518. The control register block 518 may generate control signals to control operations of a ramp generator 516, a timing generator 517 and a buffer 515. The operation of the control register block 518 may be controlled by a camera controller 532 that is included in the image processor 530.

The image processor 530 controls the operation of the image sensor 510, processes image data output from the image sensor 510, and transfers the processed data to the display 550 to display the processed data. The image processor 530 may include one or more microprocessors. Image data may be generated according to an output signal of the buffer 515. Here, the display 550 may include any device for outputting image signals. For example, the display 550 may include a computer, a mobile phone, and other image output terminals.

The image processor 530 may include the camera controller 532, an image signal processor 534 and a PC interface (I/F) 536.

The camera controller 532 controls the control register block 518. The image signal processor 534 processes image data output from the buffer 515, and outputs the processed data to the display unit 550 through the PC I/F 536.

The image signal processor 534 shown in FIG. 20 may be included in the image processor 530 or in the image sensor 510. That is, the image sensor 510 may be implemented as one chip with the image signal processor 534. The image signal processor 534 may include one or more microprocessors.

Figure 21:
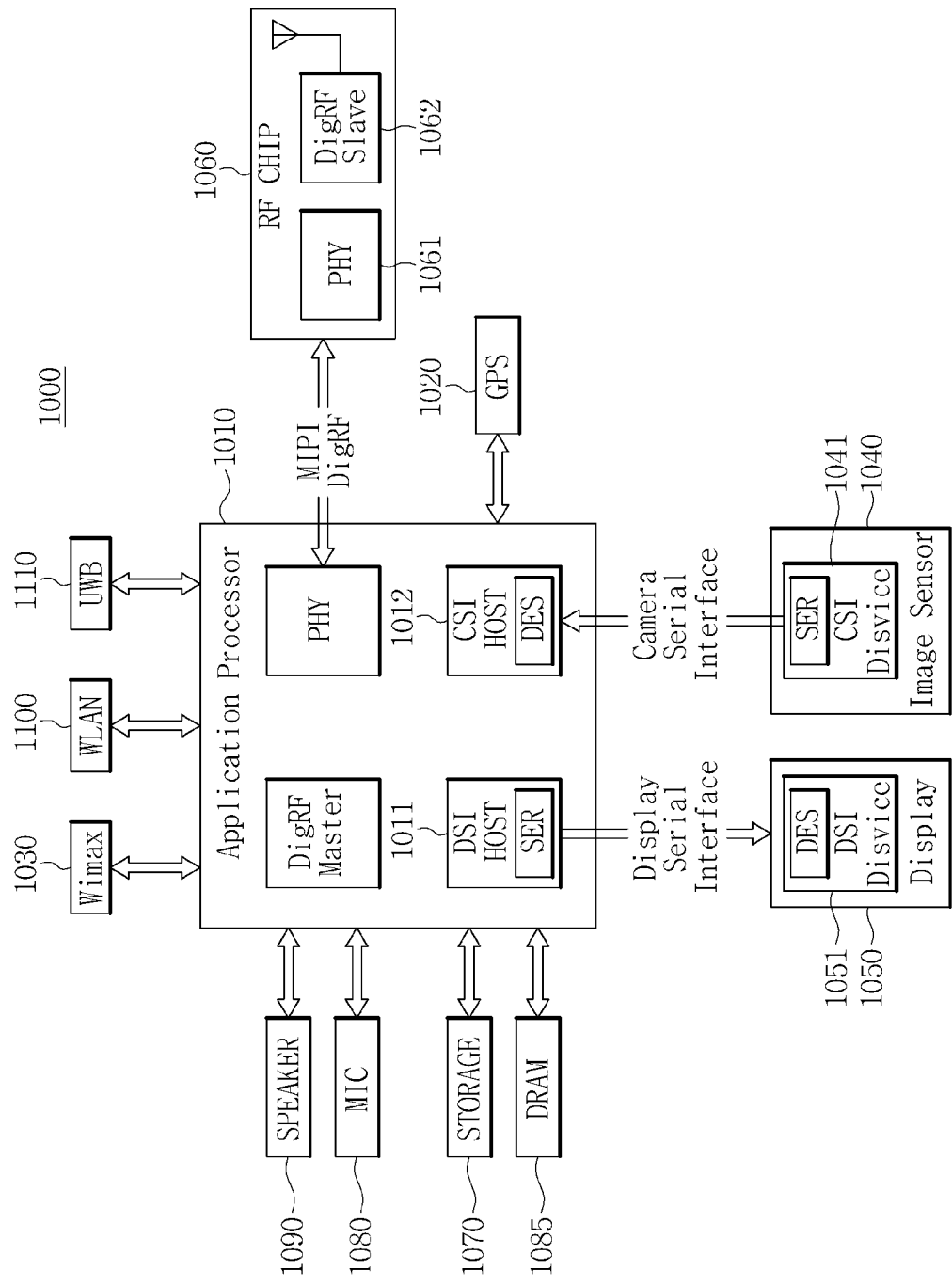
FIG. 21 is a block diagram illustrating an electronic system including the image sensor of FIG. 1 in accordance with an exemplary embodiment.

FIG. 21 is a block diagram illustrating an electronic system including the image sensor of FIG. 1 in accordance with an exemplary embodiment.

Referring to FIG. 21, an electronic system 1000 may be implemented as a data processing device that may use or support a mobile industry processor interface (MIPI), for example, a mobile phone, a personal digital assistant (PDA), a portable multimedia player (PMP), or a smart phone.

The electronic system 1000 may include an application processor 1010, an image sensor 1040 and a display 1050.

A CSI HOST 1012 implemented in the application processor 1010 may perform a serial communication with a CSI device 1041 of the image sensor 1040 through a camera serial interface (CSI). The CSI HOST 1012 may include an optical serializer, and the CSI device 1041 may include an optical deserializer.

The electronic system 1000 may further include an RF chip 1060 that communicates with the application processor 1010. The PHY 1061 of the RF chip 1060 and a PHY of the application processor 1010 may receive or transmit data according to MIPI DigRF.

The electronic system 1000 may further include a global positioning system (GPS) 1020, a storage 1070, a microphone (MIC) 1080, a DRAM 1085, and a speaker 1090. Further, the electronic system 1000 may communicate using Wordwide Interoperability for Microwave access (WiMAX) 1030, a wireless lan (WLAN) 1100, a ultra wideband (UWB) 1110, etc.

The image sensor according to exemplary embodiments includes a reset control circuit, a transfer control circuit and a read control circuit in the row driver, and in the rolling shutter mode, a transfer operation is performed on a second row group while a read operation for the first row group is performed. Further, the image sensor according to exemplary embodiments can perform the reset operation of a second frame before the read operation of a first frame is completed. Therefore, the image sensor according to exemplary embodiments can film video in a high speed without quality degradation in a rolling shutter mode as well as in a global shutter mode.

Exemplary embodiments can apply to image sensors, and image processing devices including the image sensors.

Although a few exemplary embodiments have been described, those skilled in the art will readily appreciate that many modifications are possible in exemplary embodiments without materially departing from the novel teachings and advantages.

What is claimed is:

1. An image sensor comprising:
   a row driver configured to perform decoding for a reset operation to reset a row group, a transfer operation to transfer and store charges of the row group and a read operation to read the stored charges of the row group, and to generate a transfer control signal, a reset control signal and a row selecting signal;
   a pixel array configured to perform the transfer operation on a second row group while the read operation for a first row group is performed in a rolling shutter mode, and configured to receive an optical signal, convert the optical signal to an electrical signal, and output the electrical signal as an image signal, in response to receiving the transfer control signal, the reset control signal and the row selecting signal generated by the row driver; and
   an analog-to-digital converter configured to perform an analog-to-digital conversion on the image signal output by the pixel array to generate first signals.

2. The image sensor of claim 1, wherein in a global shutter mode, the reset operation is simultaneously performed on the first row group and the second row group and the transfer operation is simultaneously performed on the first row group and the second row group, and the read operation is performed on the second row group after the read operation for the first row group is completed.

3. The image sensor of claim 1, wherein each of the first row group and the second row group includes at least one row.

4. The image sensor of claim 3, wherein each of the first row group and the second row group includes two rows, four rows or eight rows.

5. The image sensor of claim 1, wherein in the rolling shutter mode, the reset operation of a second frame is performed before the read operation of a first frame is completed.

6. The image sensor of claim 1, wherein in the rolling shutter mode, the transfer operation is performed on the first row group of a second frame while the read operation is performed on a last row group of a first frame.

7. The image sensor of claim 6, wherein in the rolling shutter mode, an operation of charge integration is performed on the second row group of a second frame while the read operation is performed on the last row group of the first frame.

8. The image sensor of claim 6, wherein in the rolling shutter mode, the reset operation is performed on the second row group of the second frame while the transfer operation is performed on the last row group of the first frame.

9. The image sensor of claim 1, wherein in the rolling shutter mode, the read operation is performed on the second row group after the read operation for the first row group is completed, and the read operation is performed on a third row group after the read operation for the second row group is completed.

10. The image sensor of claim 1, wherein the row driver comprises:
    a reset control circuit configured to control the reset operation;
    a transfer control circuit configured to control the transfer operation;
    a read control circuit configured to control the read operation; and
    a logical OR circuit configured to perform a logical OR operation on output signals of the reset control circuit, output signals of the transfer control circuit, and output signals of the read control circuit.

11. The image sensor of claim 10, wherein the reset control circuit comprises:
    a reset decoder configured to decode m signals to generate n pulse signals, where n=2m; and
    a logical AND circuit configured to perform a logical AND operation on output signals of the reset decoder and each of a first storage control signal, a first transfer control signal and a first overflow control signal to generate a first decoded storage control signal, a first decoded transfer control signal and a first decoded overflow control signal.

12. The image sensor of claim 10, wherein the transfer control circuit comprises:
    a transfer decoder configured to decode m signals to generate n pulse signals, where n=2m; and
    a logical AND circuit configured to perform a logical AND operation on output signals of the transfer decoder and each of a second storage control signal, a second transfer control signal, a first reset control signal and a second overflow control signal to generate a second decoded storage control signal, a second decoded transfer control signal, a first decoded reset control signal and a second decoded overflow control signal.

13. The image sensor of claim 10, wherein the read control circuit comprises:
- a read decoder configured to decode m signals to generate n pulse signals, where n=2m; and
- a logical AND circuit configured to perform a logical AND operation on output signals of the read decoder and each of a second reset control signal, a third transfer control signal and a first row selecting signal to generate a second decoded reset control signal, a third decoded transfer control signal and a first decoded row selecting signal.

14. The image sensor of claim 11, wherein the transfer control circuit comprises:
- a transfer decoder configured to decode m signals to generate n pulse signals (n=2m); and
- a logical AND circuit configured to perform a logical AND operation on output signals of the transfer decoder and each of a second storage control signal, a second transfer control signal, a first reset control signal and a second overflow control signal to generate a second decoded storage control signal, a second decoded transfer control signal, a first decoded reset control signal and a second decoded overflow control signal, and wherein the read control circuit comprises:
- a read decoder configured to decode m signals to generate n pulse signals (n=2m); and
- a logical AND circuit configured to perform a logical AND operation on output signals of the read decoder and each of a second reset control signal, a third transfer control signal and a first row selecting signal to generate a second decoded reset control signal, a third decoded transfer control signal and a first decoded row selecting signal.

15. An image sensor comprising:
- a row driver configured to perform decoding for a reset operation to reset a row group, a transfer operation to transfer and store charges of the row group and a read operation to read the stored charges of the row group, and to generate a transfer control signal, a reset control signal and a row selecting signal;
- a pixel array configured to perform the transfer operation on a current row while the read operation for a previous row is performed in a rolling shutter mode, and configured to receive an optical signal, convert the optical signal to an electrical signal, and output the electrical signal as an image signal, in response to the transfer control signal, the reset control signal and the row selecting signal generated by the row driver; and
- an analog-to-digital converter configured to perform an analog-to-digital conversion on the image signal output by the pixel array to generate first signals.

16. The image sensor of claim 15, wherein in a global shutter mode, the reset operation is simultaneously performed on the previous row and the current row, and the transfer operation is simultaneously performed on the previous row and the current row, and the read operation is performed on the current row after the read operation for the previous row is completed.

17. An image sensor comprising:
- a pixel array comprising a pixel driving circuit for each of a plurality of pixels, the pixel driving circuit configured to receive an optical signal, convert the optical signal to an electrical signal, and output the electrical signal as an image signal, in response to a transfer control signal, a reset control signal, and a row selecting signal; and
- a row driver configured to generate the transfer control signal, the reset control signal and the row selecting signal to control the pixel driving circuits to perform a transfer operation on a second row group to transfer and store charges of the second row group while performing a read operation for a first row group to read stored charges of the first row group, wherein the row driver comprises a transfer control circuit configured to receive a plurality of row address bits and generate a plurality of transfer control signals to activate the first row group and the second row group successively.

18. The image sensor of claim 17, wherein the row driver controls the pixel driving circuits to start the transfer operation on the second row group at the same time as starting the read operation for the first row group.

19. The image sensor of claim 17, wherein the row driver controls the pixel driving circuits to start the transfer operation on the second row group after starting the read operation for the first row group such that a portion of the transfer operation overlaps the read operation.

20. The image sensor of claim 17, wherein each pixel driving circuit comprises a photodiode and a storage diode.

* * * * *